US009455754B2

(12) United States Patent
Harrington

(10) Patent No.: US 9,455,754 B2
(45) Date of Patent: *Sep. 27, 2016

(54) RETROFIT AUTOMOBILE RADIO

(71) Applicant: Steven L. Harrington, Henderson, NV (US)

(72) Inventor: Steven L. Harrington, Henderson, NV (US)

(73) Assignee: Steven L. Harrington, Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,495

(22) Filed: May 22, 2015

(65) Prior Publication Data

US 2015/0333782 A1    Nov. 19, 2015

Related U.S. Application Data

(63) Continuation-in-part of application No. 13/728,844, filed on Dec. 27, 2012.

(51) Int. Cl.
*H05K 5/00* (2006.01)
*H04B 1/08* (2006.01)

(52) U.S. Cl.
CPC ............ *H04B 1/082* (2013.01); *H05K 5/0017* (2013.01); *Y10T 29/49117* (2015.01)

(58) Field of Classification Search
CPC ................ B60R 11/025; B60R 16/02; B60R 2011/0005; B60R 2011/0047; B60K 37/04; B60K 2300/941; H04B 1/38; H04B 1/082; F16M 13/00; G12B 9/00; H05K 5/0017; H05K 5/02; H05K 11/02; H05K 13/00

USPC ............ 455/90.1, 90.3, 345, 346, 347, 348, 455/349, 351; 361/814, 816

See application file for complete search history.

(56) References Cited

U.S. PATENT DOCUMENTS

| | | | | |
|---|---|---|---|---|
| 4,562,595 A | * | 12/1985 | Bauer | B60K 37/04 455/345 |
| 5,842,116 A | * | 11/1998 | Nishida | H04B 1/08 361/814 |
| 2008/0287093 A1 | * | 11/2008 | Harrington | B60R 11/0205 455/345 |

* cited by examiner

*Primary Examiner* — Thanh Le
(74) *Attorney, Agent, or Firm* — Thorpe North & Western LLP

(57) ABSTRACT

A replacement radio which can be used to replace a wide range of older automobile radios and fit into an almost unlimited number of dashboard configurations comprises an interchangeable radio display assembly having a radio display sized to fit into an original automobile dashboard radio display opening and a separate radio case having radio electronics therein. At least one separate radio control housing mounts replacement radio controls such as the usual tuning and volume controls into the original dashboard openings. The usual push buttons can be part of the display assembly or can be provided by a separate push button assembly. The use of separate components or modules increases the flexibility for mounting and positioning such components with respect to the dashboard and one other so the radio can be easily installed into many older automobiles. Original display markings can be provided with application of a transparent display cover.

20 Claims, 11 Drawing Sheets

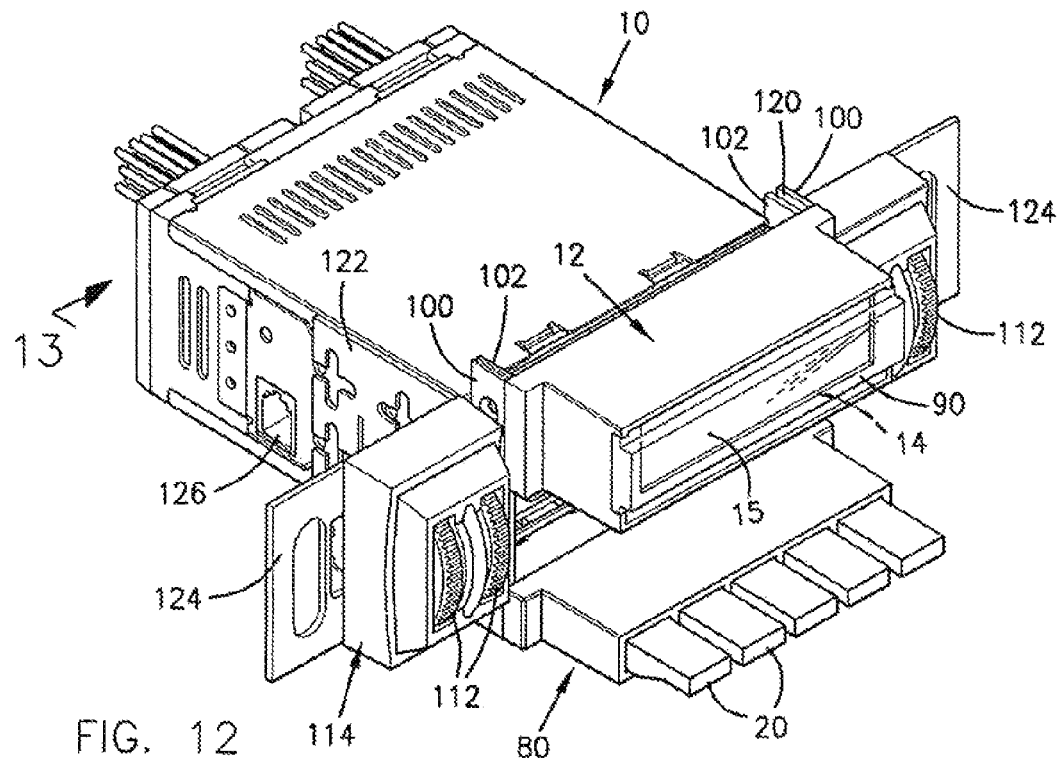
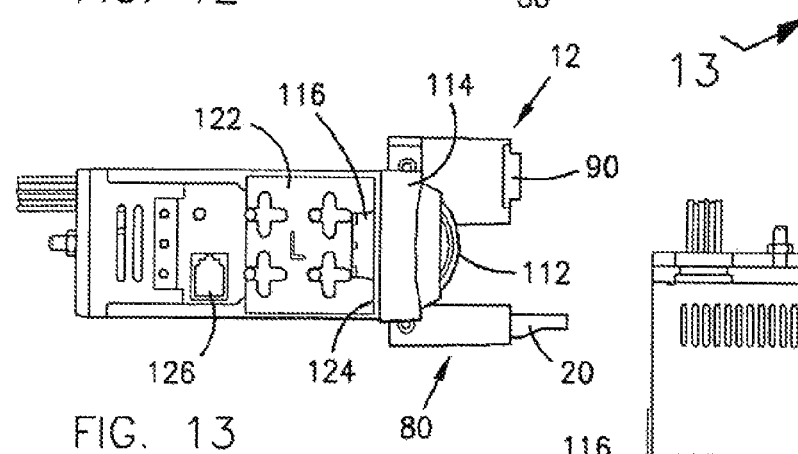
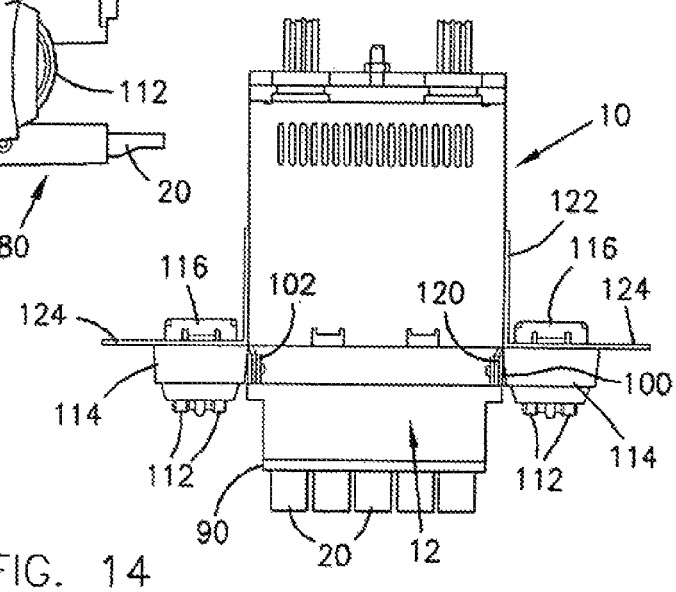

RETROFIT AUTOMOBILE RADIO

RELATED APPLICATIONS

This is a continuation-in-part of copending application Ser. No. 13/728,844, filed Dec. 27, 2012, and entitled Retrofit Automobile Radio.

BACKGROUND OF THE INVENTION

1. Field

The present invention relates generally to automobile radio receiver apparatus and particularly to aftermarket radio receiver apparatus used to replace existing radio receiver apparatus in automobiles or other vehicles, such as trucks, all of which will hereinafter be referred to as automobiles or cars.

2. State of the Art

Radios have been a standard accessory in automobiles for decades and are generally mounted in the automobile dashboard. An automobile radio will generally include a radio case housing the radio electronics and having a visual display extending therefrom or mounted therein to display to a radio user the radio settings, and, particularly for older automobiles, the radio case will generally also have a pair of control knob shafts extending therefrom for mounting control knobs for controlling and changing radio settings, such as volume and radio station tuning. Most radios in older automobiles also have a set of push buttons associated with the visual display extending from the radio case which can be set by a user to preselected radio stations and which, when a user pushes a selected push button, quickly tunes the radio to the preselected radio station associated with that push button.

Automobile radios, particularly automobile radios from the 1950's through the 1980's, generally have a faceplate forming the front of the radio case or mounted to the front of the radio case, with the radio display, the push buttons, and the control knob shafts for the control knobs extending from the case or faceplate and with the radio case extending back from the faceplate. As used herein, in my parent application Ser. No. 13/728,844, and in my prior U.S. Pat. No. 7,734,276, "faceplate" or "face plate" refers to the front of the radio case or a mounting plate mounted to the front of the radio case. The control knob shafts will generally include threaded control knob shaft sleeves extending from the radio case through which the control knob shafts extend. To mount these radios in the dashboard of an automobile, the dashboard will generally provide a display opening to receive the radio visual display and push buttons and separate radio control knob shaft openings to simultaneously receive the pair of radio control knob shafts with respective control knob shaft sleeves extending from the radio case or faceplate. The radio is then secured in the dashboard by nuts screwed onto the threaded control knob shaft sleeves from the front of the dashboard to secure the radio face plate and the radio case to the back of the dashboard. Thus, the dashboard is sandwiched between the radio case or faceplate and the nuts tightened onto the threaded control knob shaft sleeves, which securely hold the radio in place in the dashboard. When mounted in the dashboard, the radio display and push buttons will fit into the display opening in a manner so that it can be seen by a user with the push buttons accessible for operation by a user, and the control knob shafts for the control knobs will extend through the control knob shaft openings so that control knobs mounted on the shafts are accessible to a user to control the radio thus mounted. The radio case extends back from the faceplate behind the dashboard and is sized to fit into the space between the dashboard and the firewall. A back strap may sometimes also be used to secure and stabilize the back of the radio case in position behind the dashboard.

As indicated, automobile radios are generally mounted in automobile dashboards. However, each model of automobile generally has a different dashboard design with different space available behind the dashboard between the dashboard and the firewall or other equipment mounted behind the dashboard, such as heating and air conditioning system components. Usually dashboard designs change from year to year or at least every several years and with each new dashboard design, the size and placement of the radio display opening, the positioning of the control knob shaft openings for the radio, and the space between the dashboard and firewall and other equipment mounted behind the dashboard are changed. Thus, over the last fifty or more years, hundreds of different dashboards with different display opening configurations, sizes, and locations and different control knob shaft opening placements have been produced. Generally, each of the different dashboard designs with different display opening configurations, sizes, and locations and different control knob shaft opening placements were accompanied by a different radio specifically configured to fit the particular dashboard design. However, particular radios in the configurations to fit these many dashboards have long been out of production.

Radios do not last forever, and further, in recent years, there have been many improvements to automobile radios along with the inclusion of additional features such as, most recently, inputs for small portable digital memory storage devices such as Ipods, flash drives, and SD cards which can provide digital music files for playback through an automobile radio sound system. Many drivers and owners of older automobiles and classic cars wish to replace the original radio in their automobile with a new radio, either to provide a radio that works if the original radio has stopped working, or to provide a new radio with the additional features of more modern radios. Unfortunately, new original equipment replacement radios are not available for older cars, and further, new after market replacement radios to fit into the space available and having one of the many old dashboard radio configurations generally are not available.

There have been past attempts to provide replacement radios that provide adjustability of the spacing of the control knob shafts in order to allow the radio to fit a number of different dashboard radio mounting configurations, see for example, U.S. Pat. Nos. 4,067,654, 3,906,371, and 3,685,879, and my prior U.S. Pat. No. 7,734,276. However, while these systems provide for adjustment of the positioning of control knob shafts in order to fit a variety of control knob shaft opening positions, the type of positioning provided, e.g., at the opposite sides of the display, is limited as is the amount of adjustment provided. Further, such systems do not address the problem of mounting a replacement radio where there is inadequate space behind the dashboard to receive the replacement radio.

The problem still exists of providing a replacement radio for older automobiles that will fit a wide range of older automobile dashboard arrangements and make replacement radios available for use with most older automobiles. The availability of replacement radios for older automobiles is becoming more of a problem as the number of particular older automobiles in need of such replacement radios becomes more limited. Thus, it is becoming almost impossible for some classic and antique car owners to find replacement radios for their cars.

SUMMARY OF THE INVENTION

According to the invention, a replacement radio which can be used to replace a wide range of older automobile radios and fit into an almost unlimited number of dashboard configurations comprises a radio case housing the radio electronics and a separate radio display assembly adapted to fit into selected dashboard radio display openings. The separate radio display assembly can be mounted to the front of the radio case or can be connected remotely to the radio electronics in the radio case by either a connecting cable or by wireless communication. Further, where the dashboard in which the radio display assembly is to be mounted includes control knob shaft openings separate from the display opening, as in most older automobiles, the radio can further include separate control knob shafts and associated control housings connected remotely to the radio electronics in the radio case by either a connecting cable or by wireless communication. Such connections of the separate control knob shafts and associated control housings to the radio electronics in the radio case can be either directly to the radio electronics or to the radio electronics through the radio display assembly. When using separate control knob shafts and associated control housings, the control knob shafts can be mounted using special mounting brackets such as disclosed in my referenced U.S. Pat. No. 7,734,276, incorporated herein in its entirety by reference, which can also be used to mount the radio display assembly in the dashboard radio display opening.

Several advantages are provided by the separate radio display assembly. In situations where the space available behind the dashboard is insufficient for mounting the replacement radio case behind the radio display assembly in the dashboard, the radio case can be positioned remotely from the radio display assembly in a location where there is room to mount the radio case. This can be, for example, in a remote location behind the dashboard or in another location such as in the engine compartment or in the trunk. Another advantage is that a single radio case can be used with a variety of different radio display assemblies so that an appropriate radio display assembly can be selected to fit a particular arrangement of dashboard radio display openings. Rather than manufacturing and stocking a number of different radios to provide displays to fit a number of different dashboard radio display openings, e.g., to fit a number of different older model automobiles, a single radio case with radio electronics therein can be manufactured and stocked along with a number of different display assemblies to fit the different radio display opening sizes and arrangements in different model automobiles. The radio display assemblies will generally be less expensive than an entire radio with case and built in display would be. Also, the radio display assemblies are smaller and easier to stock than the entire radio case. The use of separate radio display assemblies allows availability of a larger number of display assemblies with increased likelihood that a display assembly will be available to fit into a particular older model automobile. The combination of the separate display assemblies and separate control knob shafts and associated control housings provides an extremely flexible system for providing replacement radios for older or limited production automobiles.

In one embodiment of the invention, the display assembly includes both the visual display and the push buttons, with the push buttons arranged in fixed position under the visual display. Many, if not most, of the older car radios used this configuration, but in many variations of size and separation to fit many different sized and shaped dashboard display openings. If a display assembly including both the visual display and the push buttons according to the invention is sized to fit into a small dashboard display opening, it therefore will also fit into larger dashboard display openings so will fit into and can be used with a large number of older automobiles. Further, several variations of display assemblies of different sizes and spacings can be made available to fit different size display openings. In addition, a decorative faceplate in the form of a filler (usually referred to as a bezel) or a cover (usually referred to as a faceplate) as shown in my U.S. Pat. No. 7,734,276, incorporated herein by reference in its entirety, and both referred to herein as a decorative faceplates, can be provided to fill in gaps or cover gaps between the edges of the display assembly and the edges of a larger display opening in the dashboard. The decorative faceplates are also used to replace decorative faceplates on or in the dashboards of the automobiles whose radios are being replaced to maintain the appearance of the original radios. The decorative faceplate will provide a finished look to the display assembly installation in the dashboard, and may also mount various components of the replacement radio to the dashboard. A selection of decorative faceplates can be made available to fit various dashboard display openings.

While many older automobile radios provided the push buttons below the visual display and many of the display openings in older automobile dashboards are sized to receive such an assembly, older cars provide many different sized and shaped dashboard display openings and the radios produced to fit into such dashboard openings, even when providing the push buttons under the visual display, have differences in the size of the display (combination of visual display and push buttons), positioning of the push buttons with respect to the visual display, and separation between the push buttons and the visual display. Thus, while a display assembly including both the visual display and the push buttons according to the invention can be sized to fit into a small dashboard display opening, and therefore will also fit into larger dashboard display openings so will fit into and can be used with a large number of older automobiles, there will be some dashboard display openings in which it will not fit and there will be some situations where a smaller display assembly having a fixed visual display and push button arrangement will not give the desired appearance in a larger dashboard display opening or will not provide the desired positioning of the push buttons in relation to the visual display. For example, a number of Chrysler and Dodge radios in the 1964-1974 time period had split dash spacing of the visual display and push buttons with separate openings for the visual display and the push buttons so a portion of the decorative faceplate extended between the visual display and the push buttons. While a display assembly having both the visual display and the push buttons could fit into the dashboard display opening, it would not provide the same face plate separation appearance of the original radio. Further, there are older automobile radios where the push buttons are not arranged under the visual display and/or where separate dashboard openings are provided for the visual display and the push buttons. In such instances, a display assembly having the push buttons arranged under the visual display will not fit or will not provide the appearance of the original. Therefore, in a further embodiment of the invention, the display assembly of the invention will include only the visual display and a separate push button assembly will be provided to separately provide the push buttons.

In addition, while most older automobile radios provided control knob shafts extending forwardly from the front of the radio to extend through the dashboard radio control knob shaft openings, a number of Chrysler and Dodge radios in the 1964-1974 period had thumbroller controls mounted on the radio face plate. In a still further embodiment of the invention, rather than providing separate control knob shafts and associated control housings, separate control housings having thumbroller controls rather than control shafts are provided. These separate control housings having thumbroller controls are separately mounted to extend through a radio faceplate along with the separate visual display and separate push buttons to provide the original appearance of these radios.

While the provision of a number of the special mounting brackets for the separate control knob shafts for selection by an installer of an appropriate mounting bracket for a particular dashboard configuration of control knob mounting shaft openings provides flexibility for the installer as described in my referenced U.S. Pat. No. 7,734,276, the provision of a number of different radio display assemblies to a dealer or other supplier of replacement radios so the dealer or other supplier can select an appropriate display assembly for a particular automobile in which the radio is to be mounted, provides flexibility to the dealer or other supplier to be able to supply a radio to fit a particular automobile. For example, a manufacturer or other supplier of replacement automobile radios can maintain a warehouse with a supply of the same radio cases having the same radio electronics therein along with a supply of a number of different radio display assemblies each adapted to connect to that same radio case. When a customer orders a replacement radio to fit a particular model older automobile, the supplier can drop ship a radio case and the specifically needed radio display assembly to the customer. Further, since each radio case and the radio electronics therein is the same, regardless of the particular radio display assembly used, manufacturing economies and efficiencies for the radio cases and electronics can be achieved. Where the display assembly has only the visual display and a separate push button assembly provides the push buttons, when a customer orders a replacement radio to fit a particular model older automobile, the supplier can drop ship a radio case and the specifically needed radio display assembly along with the specifically needed push button assembly to the customer. In either case, where a face plate is needed, the appropriate face plate for the particular model older automobile is also shipped. These separate components are then assembled as the components are installed in the automobile.

Since a particular visual display is adapted for use in at least several older automobile radios, the visual display will not be marked with the markings and/or logo of the original radio visual display. Therefore, the invention may include transparent display covers adapted to be placed over the display screen of the visual display which covers have the markings and/or logo printed thereon that were included on the original radio display screen. The appropriate screen cover for the particular automobile in which the radio is installed will complete the installation of the radio in the particular automobile and provide the appearance of the original radio.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 12 is a front pictorial view of an embodiment of a replacement radio of the invention with components connected together as a unit;

FIG. 13 is a side elevation of the unit of FIG. 12:

FIG. 14 is a top view of the unit of FIG. 12;

Figure 1:
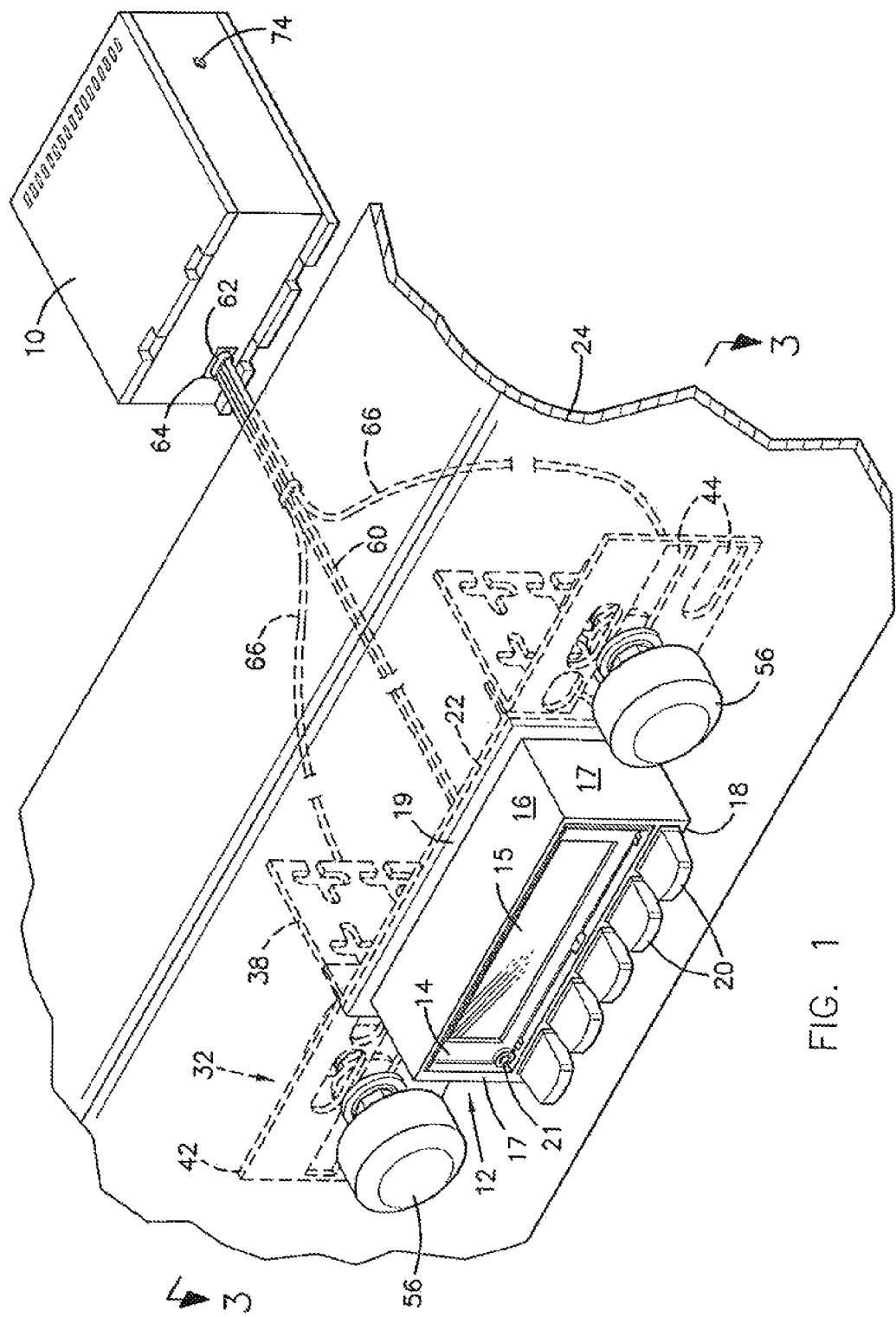
FIG. 1 is a fragmentary pictorial view of an automobile dashboard showing a front top left corner pictorial view of an example of a replacement automobile radio of the invention installed therein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

An example of one embodiment of a replacement retrofit radio of the invention is shown in FIGS. 1-4 and includes radio electronics within a radio case 10. A separate radio display assembly 12 includes a front 14 with display window or screen 15, a top 16, opposite sides 17, and a bottom 18, which extend from a mounting plate 19. Control buttons 20 extend through front 14 below display window 15. Buttons 20 can be used for various function controls, for example, for switching between preset radio stations. The replacement radio can include various functions, such as the ability to play digital music files, that did not exist in the original radio that the replacement radio is replacing. In addition to buttons 20, the radio display assembly 12 can also include other control buttons, not shown, for controlling radio functions, and one or more input and/or output jacks, such as shown at 21, for connecting various portable sound source devices, such as digital memory storage devices such as Ipods, flash drives, and SD cards. The buttons 20, and any other control buttons and/or input jacks and/or output jacks can be located in any desired position in radio display assembly 12.

The radio display assembly 12 is sized so as to fit into a dashboard radio display opening 22, in dashboard 24, for which the replacement radio display assembly 12 will be expected to fit. The radio display assembly 12 does not have to fit exactly into the dashboard display opening, and to provide versatility to the mounting plate 19, it can be sized to fit into the smallest expected size of dashboard display opening for which the particular radio display assembly 12 will be expected to fit. Therefore, although the radio display assembly 12 is shown as coextensive with and filling the entire dashboard radio display opening 22, the radio display assembly 12 may be configured to be smaller in size in relation to the dashboard display opening 22 so will fill only a portion of the dashboard display opening. In such cases where the radio display assembly 12 will be sized to fit into the smallest expected dashboard display opening, there will be some dashboard display openings that will be larger than the radio display assembly 12. Where the radio display assembly 12 is smaller than the dashboard display opening into which it is placed, various types of fillers or covers, not shown, can be used to fill or cover the area between the edges of the radio display assembly 12 and the edges of the dashboard display opening into which the radio display assembly 12 is inserted. Such fillers and covers are shown and described in my previously referenced U.S. Pat. No. 7,734,276.

Most older automobile radios also included a pair of control knob shafts with threaded control knob shaft sleeves extending from the radio case or from a radio faceplate to extend through separate control shaft openings through the dashboard. To mount these older radios in the dashboard of an automobile, the dashboard will generally provide a display opening to receive the radio display and radio control knob shaft openings to simultaneously receive the pair of radio control knob shafts with respective threaded control knob shaft sleeves extending from the radio or radio faceplate. The radio is then secured in the dashboard by nuts screwed onto the threaded radio control knob shaft sleeves from the front of the dashboard to secure the radio case or the radio faceplate with the radio case extending rearwardly therefrom to the back of the dashboard. Thus, the dashboard is sandwiched between the radio case or the radio faceplate and the nuts tightened onto the threaded control knob shaft sleeves, which securely hold the radio in place in the dashboard.

Since the replacement radio of the invention is to provide an appearance similar to the original radio it is replacing, where the original radio had radio control knob shafts extending through radio control knob shaft openings in the dashboard, the replacement radio of the invention will also provide radio control knob shafts to extend through the radio control knob shaft openings in the dashboard. To provide the control knob shafts, the radio display assembly can be configured similarly to a radio faceplate so that the radio display and the control knob shafts all extend from the radio display assembly. However, to increase the flexibility of the placement of the radio control knob shafts with respect to the radio display assembly, thereby allowing the same radio display assembly to be used with various different control knob shaft opening positions, separate control knob shafts and associated control housings and special mounting brackets as described in my referenced U.S. Pat. No. 7,734,276 can be used with the radio display assembly of the invention and will be shown and described as used with the example embodiment of radio display assembly 12 of the invention.

Figure 2:
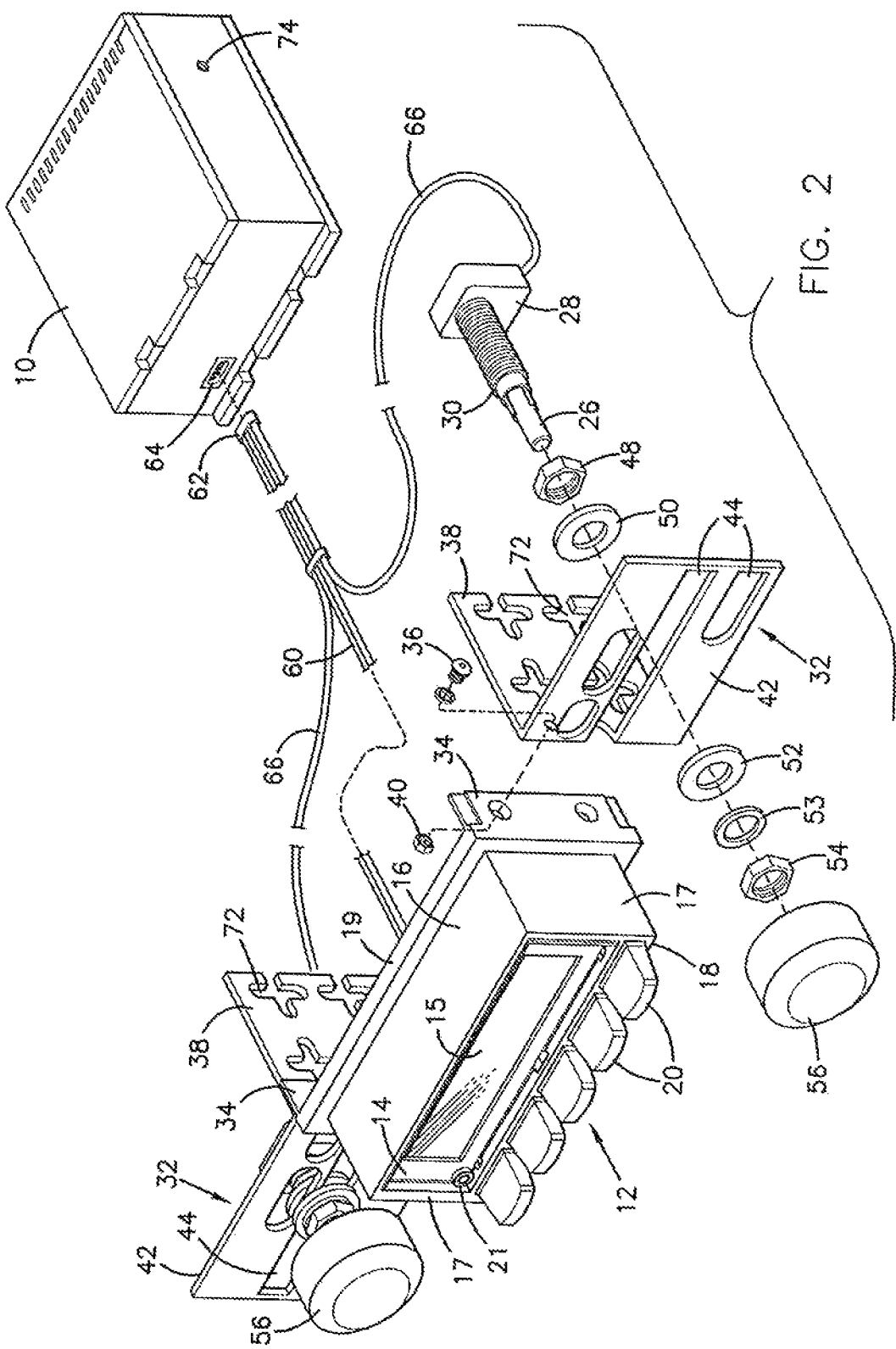
FIG. 2 is a similar pictorial view showing the closer mounting bracket and control knob mounting shaft in assembly view.
Figure 3:
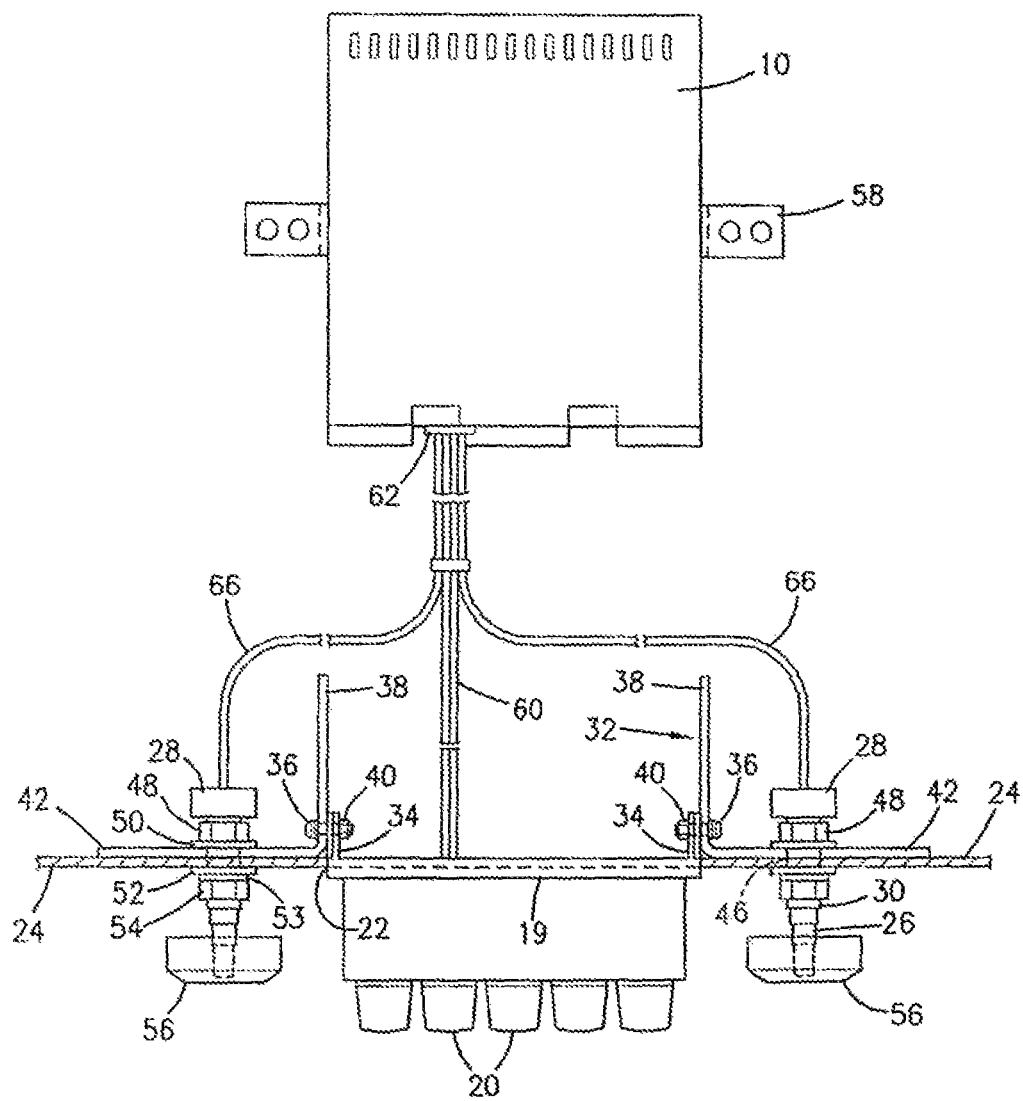
FIG. 3 is a top plan view of the radio of FIGS. 1 and 2 installed in a dashboard with the radio case mounted remotely from the display assembly.
Figure 4:
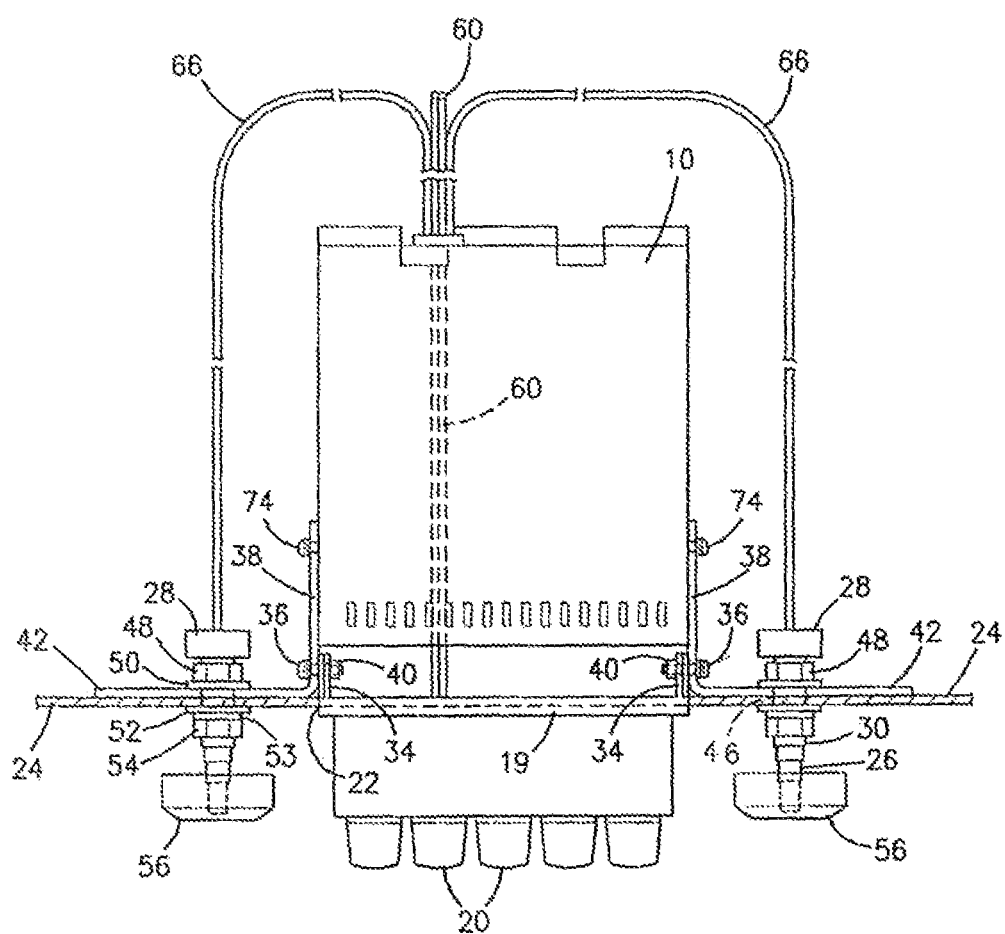
FIG. 4 is a top plan view of the radio of FIGS. 1 and 2 installed in a dashboard with the radio case mounted to the back of the radio display assembly.

As best seen in FIG. 2, separate control knob shafts 26 extend from associated control housings 28 and have a threaded sleeve 30 around the portion of the control knob shaft 26 as it extends from the control housing 28. L brackets 32 are attached to opposite sides 34 of radio display assembly mounting plate 19 by, for example, screws 36 extending through legs 38 of brackets 32 and respective mounting plate sides 34 into nuts 40. Leg 42 of each L bracket 32 extends outwardly from the front of radio display assembly mounting plate 19. As shown, the legs 42 extend from the front of mounting plate 19 in opposite directions. These bracket legs 42 mount control knob shaft threaded sleeves 30 which then are used to mount the radio display assembly 12 in the dashboard 24. Bracket legs 42 include slots 44 which slidingly receive shaft sleeves 30 therein so that shaft sleeves 30 and control knob shafts 26 can be adjustably positioned at any location along the slots 44. Various alternate slot configurations can be used, such as the slot configurations as shown in referenced U.S. Pat. No. 7,734,276. To install the radio display assembly into the dashboard 24, a set of L brackets 32 is selected to be attached to the radio display assembly mounting plate 19 that will allow the proper spacing and positioning of the control knob shafts 26 with respect to the radio display assembly 12 so that when the radio display assembly 12 is positioned in the dashboard radio display opening 22, the control knob shafts 26 will be positioned in alignment with dashboard radio shaft openings 46, FIGS. 3 and 4, provided in the particular dashboard 24. Control knob shafts 26 and threaded shaft sleeves 30 are extended through dashboard radio shaft openings 46. Before extending shafts 26 through dashboard radio shaft openings 46, nuts 48 are screwed onto threaded sleeves 30, FIG. 2, and are positioned on sleeve 30 so as to adjust the amount of extension of shafts 26 beyond the front of dashboard 24. Washers 50 are placed on threaded sleeves 30 and the shafts 26 with threaded sleeves 30 are then inserted through the slots 44 in bracket legs 42 and through dashboard radio shaft openings 46 in dashboard 24 so that washers 50 abut against the back surface of bracket legs 42. With the shafts 26 and sleeves 30 extending through dashboard radio shaft openings 46, washers 52 and 53 are placed on sleeves 30 in front of dashboard 24 and nuts 54 are tightened onto sleeves 30 to sandwich dashboard 24 against bracket leg 42 between nuts 48 and 54. This mounting allows for mounting of the shafts 26 on various thicknesses of dashboards 24. Because the bracket leg 42 is sandwiched against the back of dashboard 24 securely between nuts 48 and 54, and because bracket 32 is attached to radio display assembly 12, radio display assembly 12 is securely attached to the dashboard 24. To complete the installation, knobs 56 are pushed onto the ends of shafts 26. With the control knob shafts and associated control housings completely separate from the radio display assembly, they are free to be moved and positioned as necessary to fit into various arrangements of receiving dashboard shaft openings.

Radio electronics are housed in a radio case 10, which, as shown, is separate from and may be located remote from, the radio display assembly 12. This allows the radio case 10 with the radio electronics housed therein to be spaced from and mounted separately from the radio display assembly 12. The two are operatively connected, such as by a connecting cable 60 which extends from radio display assembly 12 to radio case 10. At least one end of connecting cable 60 has a plug 62 which can be plugged into a receiving socket 64, shown here in radio case 10. A similar plug can be located at the opposite end of connecting cable 60 to be received by a receiving socket in the radio display assembly 12, or cable 60 may be connected directly to radio display assembly 12. With this arrangement of the separate radio display assembly 12 for mounting in the automobile dashboard and the separate radio case 10, the radio case 10 can be mounted in any desired location where there is space for its mounting. This means that a replacement radio display assembly 12 which matches the appearance of the original radio faceplate in a particular vehicle can be mounted in the dashboard of the vehicle, and if the new replacement radio case 10 does not fit into the space immediately behind the radio display assembly 12 in the dashboard, the radio case can be mounted elsewhere where there is room for mounting. FIG. 3, which shows the radio case remote from the radio display assembly, shows a mounting strap 58 which can be used in mounting the radio case in a desired location. However, various ways of mounting the radio case 10 in a desired location can be used.

With the control knob shafts 26 and associated control housings 28 separate from the radio case 10 and from the radio display assembly 12, connecting cables 66, extend from each control housing 28 to radio case 10 to operatively connect the controls in control housing 28, which are operated by control knobs 56 and control knob shafts 26, to the radio electronics in radio case 10. The connecting cables 66 can be permanently connected into the radio within case 10, or can be removably connected through a plug on the end of each connecting cable to receiving sockets in radio case 10. While each of the connecting cables 66 from control housings 28 can be separately connected to radio case 10 with separate plugs and sockets, it has been found convenient to connect connecting cables 66 from each of the control housings 28 together along with connecting cable 60 from the radio display assembly for at least the portion of the cables toward the radio case 10, as shown, and providing a single plug 62 and socket 64 for attachment of the cables to the radio case 10. This keeps the cables together for neater wiring from the radio display assembly and control housings, which are installed in relatively close proximity, to the radio case, which may be remotely located. The various connecting cables 60 and 66 are separated near the ends thereof which connect to the radio display assembly 12 and the separate control housings 28 so that connection to the various spaced components is not interfered with. While the cables 66 are shown connected directly to the control housings 28, end plugs and receiving sockets can be provided so the respective cables 66 can be connected and disconnected at control housings 28. Further, while cables 66 are shown connecting control housings 28 to radio case 10, the cables 66 can extend from control housings 28 to radio display assembly 12 with the control signals from control housings 28 relayed from radio display assembly 12 to radio case 10 through connecting cable 60 extending between radio display assembly and radio case 10. Any desired number of conductors can be included in cables 60 and 66 as necessary to transmit the required signals between the components. Alternately, rather than connecting the components with connecting cables, the connections could be done through wireless communication.

In situations where there is room for the radio case 10 behind the radio display assembly behind the dashboard, the radio case 10 can be mounted immediately behind the radio display assembly 12 as shown in FIG. 4. In the example mounting shown, the L bracket legs 38 extend rearwardly of the attachment to the radio display assembly 12. The radio case 10 is shown having a width approximately equal to the width of the display assembly so can fit closely between the extensions of the bracket legs 38 and be secured to the L bracket legs 38, such as by screws 70 extending through end mounting openings 72 in L bracket legs 38, and into screw receiving holes 74 provided in the sides of the radio case 10. Again, various ways of mounting radio case 10 behind the dashboard and directly behind the display assembly can be used. For example, if the radio case is smaller in width than the space between the L bracket legs 38, additional brackets can be used to attach the radio case to the L bracket legs 38. Further, while the radio case 10 is shown in FIG. 4 as oriented so that cables 60 and 66 plug into the case 10 at the rearward end of the case, which provides additional room for attaching the cables, the radio case can be oriented so the cables are attached between the display assembly and the end or side of the radio case 10 facing the display assembly, or attached elsewhere on radio case 10.

While many older automobile radios provided the push buttons below the visual display and many of the display openings in older automobile dashboards are sized to receive such an assembly, older cars provide many different sized and shaped dashboard display openings and the radios produced to fit into such dashboard openings, even when providing the push buttons under the visual display, have differences in the size of the display (combination of visual display and push buttons), positioning of the push buttons with respect to the visual display, and separation between the push buttons and the visual display. Thus, while a display assembly including both the visual display and the push buttons according to the invention can be sized to fit into a dashboard display opening, there will be some dashboard display openings in which it will not fit and there will be some situations where a display assembly having a fixed visual display and push button arrangement will not give the desired appearance in a larger dashboard display opening or will not provide the desired positioning of the push buttons in relation to the visual display. For example, a number of Chrysler and Dodge radios in the 1964-1974 time period had split dash spacing of the visual display and push buttons with separate openings for the visual display and the push buttons so a portion of the decorative faceplate extended between the visual display and the push buttons. While a display assembly having both the visual display and the push buttons could fit into the dashboard display opening, it would not provide the same decorative faceplate separation appearance of the original radio. Further, there are older automobile radios where the push buttons are not arranged under the visual display and/or where separate dashboard openings are provided for the visual display and the push buttons. In such instances, a display assembly having the push buttons arranged under the visual display will not fit or will not provide the desired appearance of the original.

Figure 5:
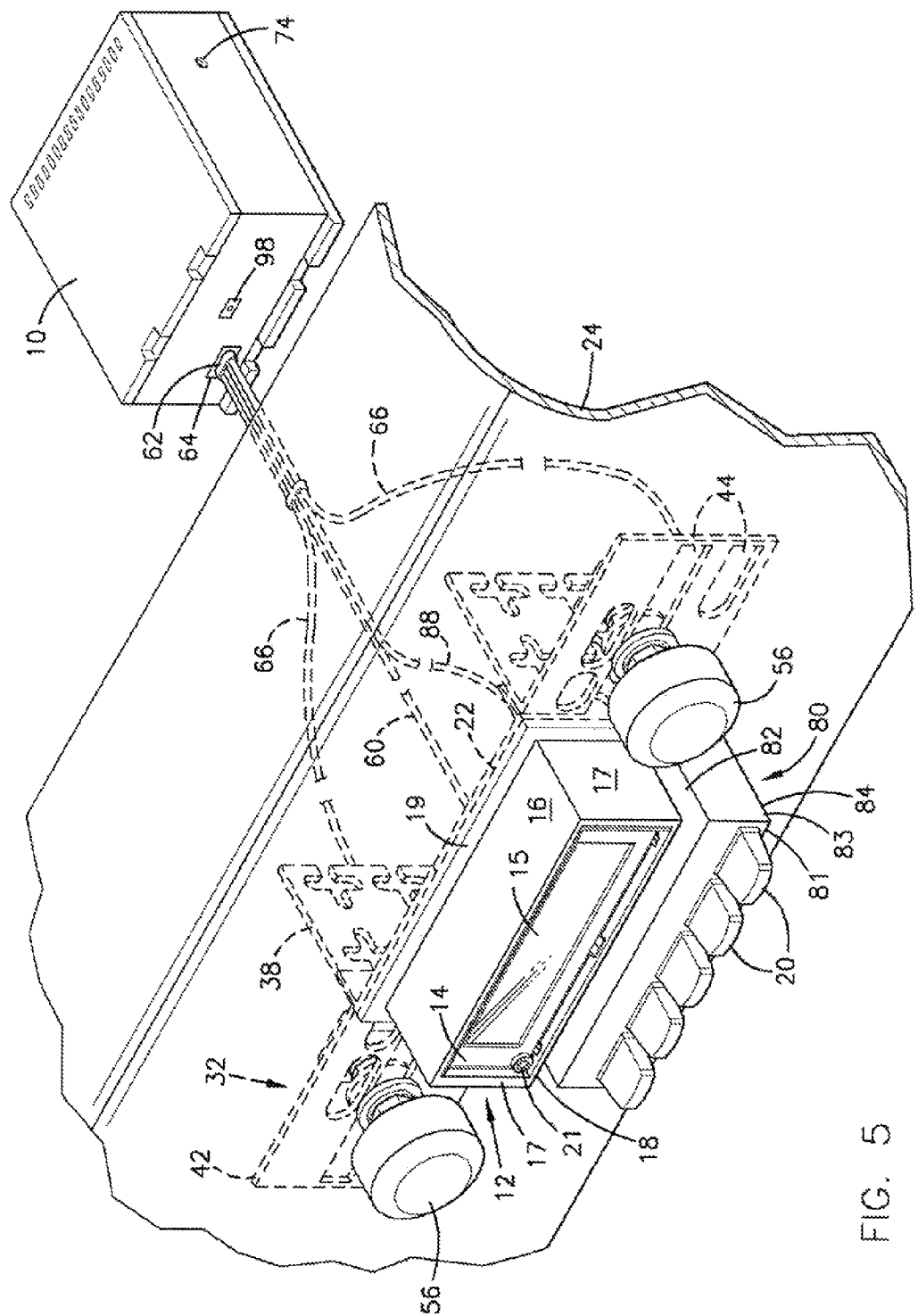
FIG. 5 is a fragmentary pictorial view of an automobile dashboard similar to that of FIG. 1, showing a further example of a replacement automobile radio of the invention having separate display and push button assemblies installed therein.
Figure 6:
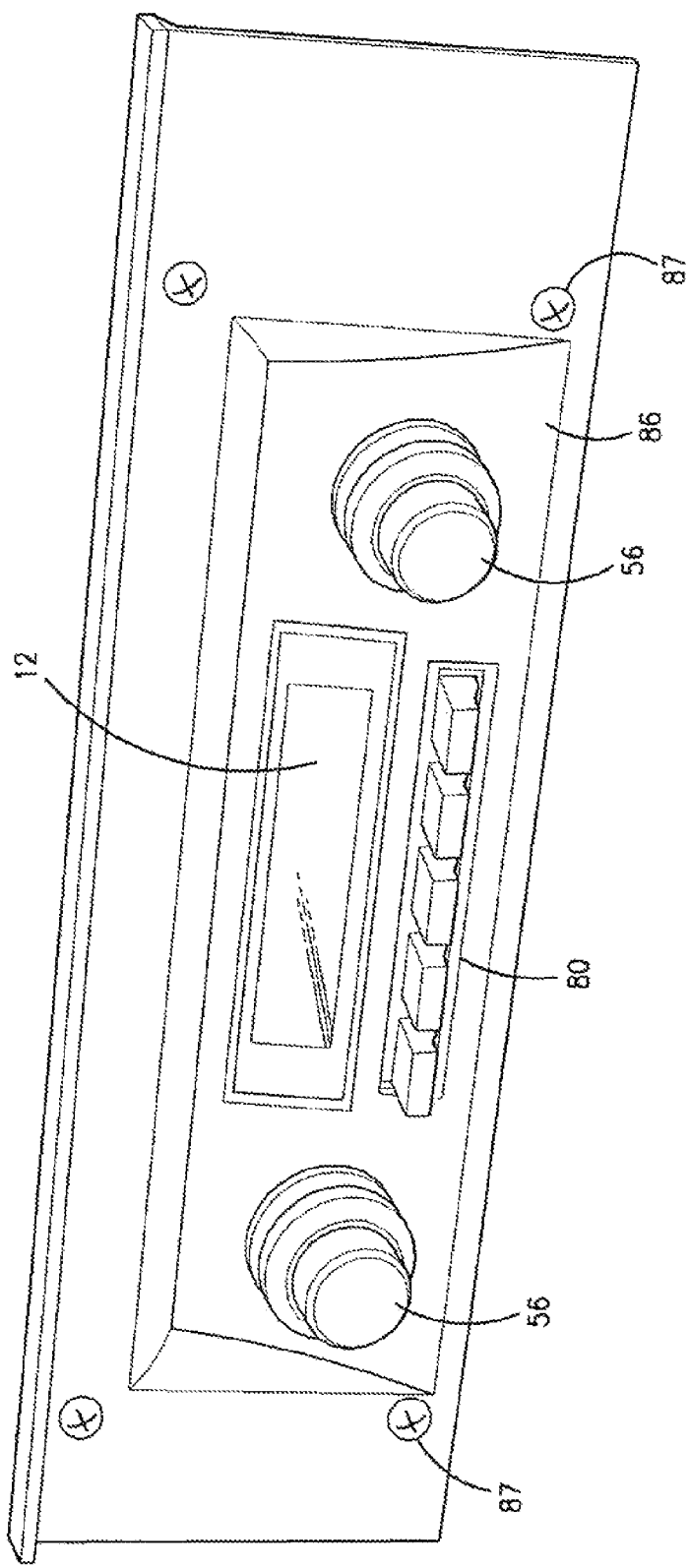
FIG. 6 is a view of a dashboard faceplate showing an installed replacement automobile radio having separate display and push button assemblies similar to the embodiment shown in FIG. 5.

FIGS. 5-15 show an embodiment of the invention where the display assembly includes the visual display and the push buttons are provided in an additional, separate push button assembly. FIG. 5 is similar to that of FIG. 1, but shows a separate push button assembly 80 from which the push buttons 20 extend. As in FIG. 1, radio display assembly 12 includes a front 14 with display or screen 15, a top 16, opposite sides 17, and a bottom 18, which extend from a mounting plate 19. As indicated, radio display 12 does not include the push buttons 20. The push buttons 20 extend from a separate push button assembly 80 including a front 81, a top 82, opposite sides 83, and a bottom 84. Push button assembly 80 can be mounted completely separately from the display assembly 12, or may be attached by a bracket to the display assembly if mounted below the display assembly or above the display assembly. However, with the push button assembly 80 separate from the display assembly, the bracket mounting the push button assembly below the display assembly 12 as shown in FIG. 5 can be spaced a variable desired distance below the display assembly. It is not fixed in position with respect to the display as it is in the embodiment of FIG. 1. When attached to the display assembly, the push button assembly is mounted to the dashboard by the attachment of the display assembly to the dashboard, as described for FIG. 1. Both the display assembly 12 and the push button assembly 80 can extend through the same display opening in the dashboard, and may be separated by a portion of a decorative faceplate 86, FIG. 6, which shows the display assembly 12 and the push button assembly 80 extending through different openings in the decorative faceplate 86. Control knobs 56 shown in FIGS. 5 and 6 are mounted on control knob shafts which also extend through decorative faceplate 86. If all of the components, i.e., display assembly 12, push button assembly 80, and control knob shafts all extend through the decorative faceplate 86, and the control knob shafts do not also extend through control knob shaft openings in the dashboard behind decorative faceplate 86, the decorative faceplate 86 may be secured to the dashboard behind it by, for example, screws 87. In this way, these components are secured to the dashboard by the decorative faceplate 86.

As shown in FIG. 5, the separate push button assembly 80 will be operatively connected to the radio electronics in radio case 10 by cable 88 which extends from push button assembly 80 to radio case 10. FIG. 5 shows cable 88 joining cable 60 from the display assembly and cables 66 from the control housings 28 before attachment to radio case 10. However, cable 88 from push button assembly 80 could separately attach to radio case 10 or could attach to display assembly 12 so signals from push button assembly 80 would be forwarded through display assembly 12 and cable 60 to radio case 10.

Figure 7:
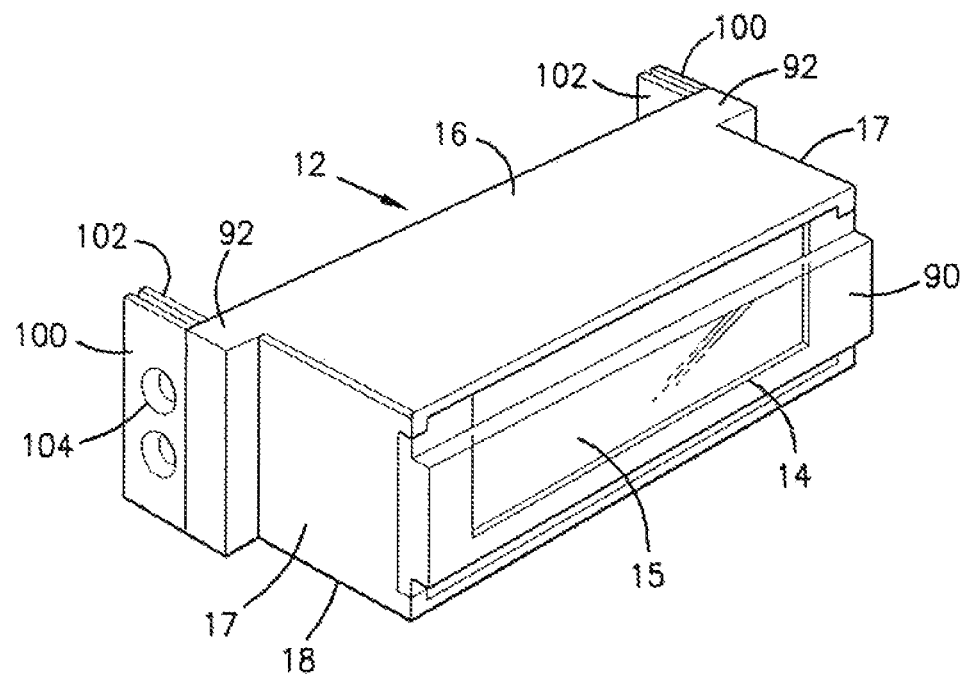
FIG. 7 is a front pictorial view of a separate display assembly.
Figure 8:
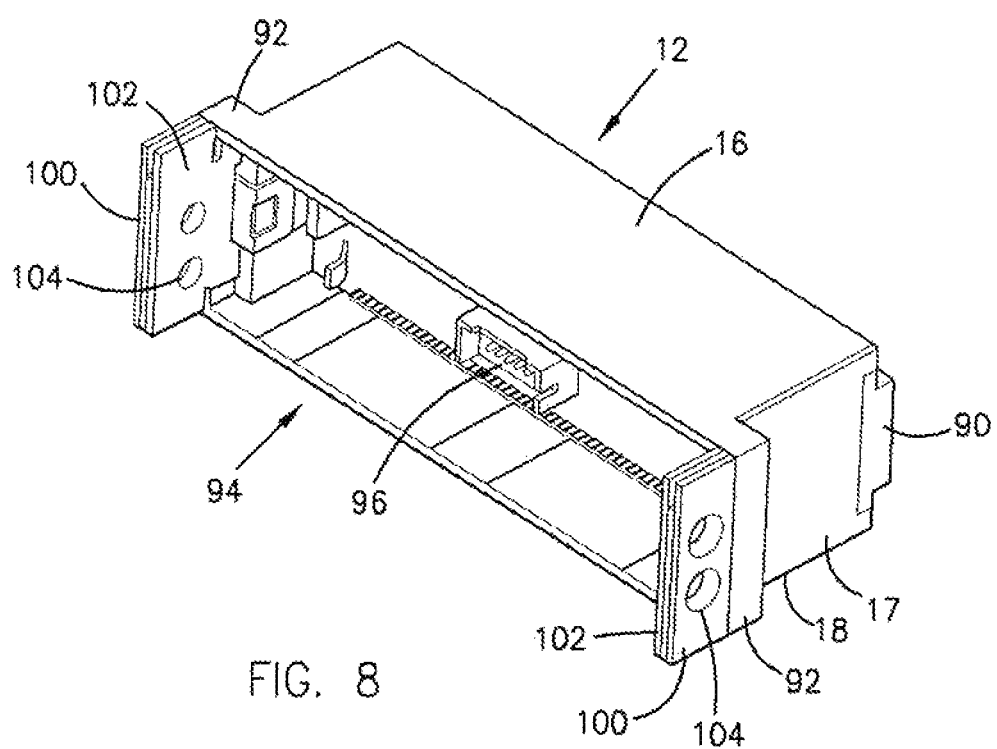
FIG. 8 is a rear pictorial view of the separate display assembly of FIG. 7.

FIGS. 7 and 8 show the separate display assembly 12 having front 14 with display or screen 15, a top 16, opposite sides 17, and a bottom 18. A lens 90 extends over display IS. The back of the display assembly 12 is wider than the forward portion with side extensions 92 extending outwardly from opposite sides 17 to increase the width of the back of the display assembly. The back of the display assembly opens into a rear recess 94, FIG. 8, which can receive an end of a radio case 10 if radio case 10 is to be mounted directly to the display assembly. FIG. 14 shows an end of a radio case 10 inserted into the back of the display assembly 12. As seen in FIG. 8, a socket 96 is provided in recess 94 into which a plug on the end of cable 60 shown in FIG. 5 (plug not shown) may be inserted to operatively connect display assembly 12 to radio case 10 when radio case 10 is located remotely from the display assembly as shown in FIG. 5. However, if radio case 10 is to be mounted with the display assembly to extend rearwardly therefrom behind the dashboard, an end of radio case 10 can be provided with a built in plug 98, FIG. 5, positioned to be inserted into socket 96 as that end of radio case 10 is inserted into display assembly recess 94. This will eliminate the need for cable connections when the case 10 is connected directly to the display assembly. This type of connection can also be used with the embodiment of FIGS. 1-4.

Display assembly 12 as shown in the embodiment of FIGS. 7 and 8 may include mounting flanges, such as outer mounting flanges 100 and inner mounting flanges 102 extend from the back of opposite sides of side extensions 92 and include holes 104 therein for attaching various mounting brackets or other components. Mounting flanges 100 correspond to the opposite sides 34 of radio display assembly mounting plate 19 in the embodiment of the display assembly shown in FIGS. 1-4. Thus, the L brackets 32 which mount the radio control knob shafts and the associated control housings 28 to the display assembly embodiment of FIGS. 1-4, and similarly as shown in the embodiment of the display assembly and separate push button assembly of FIG. 5, can be similarly mounted to the mounting flanges 100 in the display assembly embodiment of FIGS. 7 and 8. When a separate display assembly and push button assembly are used, as shown in FIG. 5, a further mounting bracket, not visible in FIG. 5, can be attached to the opposite sides 34 of radio display assembly mounting plate 19 shown in FIG. 5 along with L brackets 32, or L brackets 32 can be modified to extend to the desired mounting position of the push button assembly, to mount push button assembly in the desired position below the separate display assembly as shown in FIG. 5.

Figure 9:
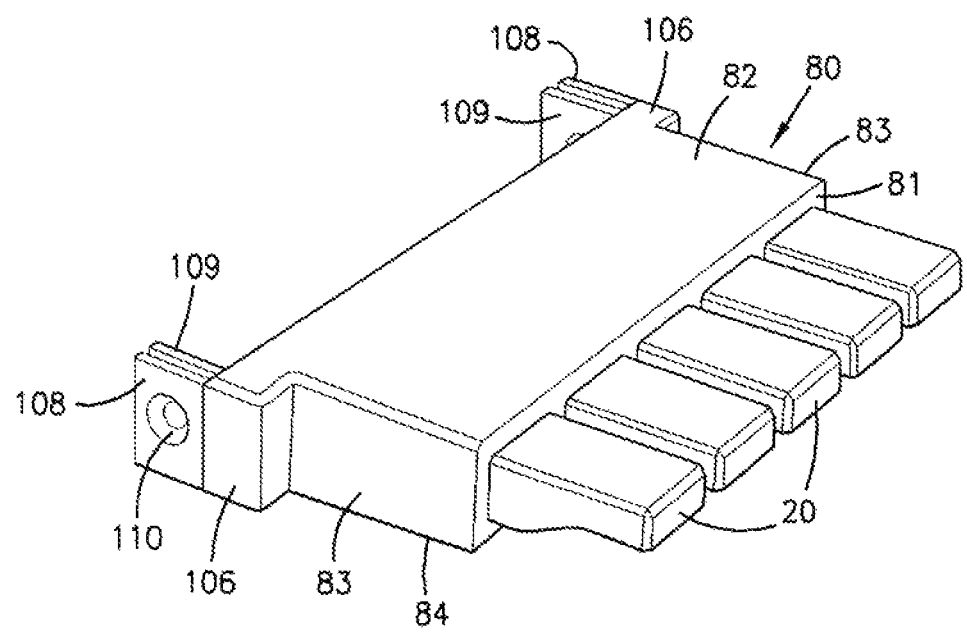
FIG. 9 is a front pictorial view of a separate push button assembly.

FIG. 9 shows a separate push button assembly 80 having a front 81, a top 82, opposite sides 83, and a bottom 84. Push buttons 20 extend through front 81. Similarly to the embodiment of the display assembly 12 shown in FIGS. 7 and 8, the back of the push button assembly 80 is wider than the forward portion with side extensions 106 extending outwardly from opposite sides 83 to increase the width of the back of the push button assembly. The back of push button assembly 80 can have a receiving socket (not shown) for receiving a plug on the end of cable 88 shown in FIG. 5 (plug not shown) which may be inserted into the receiving socket to operatively connect push button assembly 80 to radio case 10 when radio case 10 is located remotely from the display assembly 12 as shown in FIG. 5, when radio case 10 is mounted to display assembly 12, or wherever radio case 10 is located. Push button assembly 80 may have mounting flanges, such as outer mounting flanges 108 and inner mounting flanges 109, similar to display assembly mounting flanges 100 and 102, extending from the back of opposite sides of side extensions 100 and include holes 110 therein which can be used for attaching push button assembly 80 as desired.

Figures 10, 11:
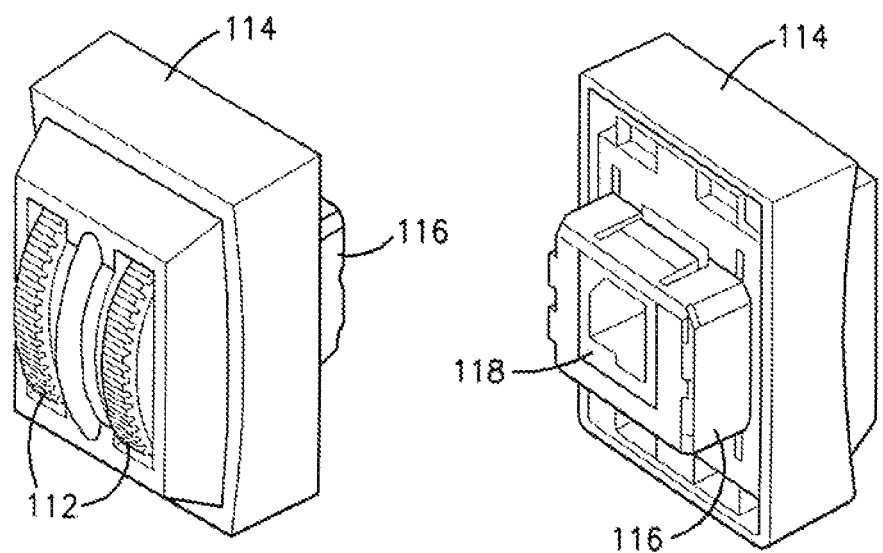
FIG. 10 is a front pictorial view of a separate control housing having thumbroller controls.
FIG. 11 is a rear pictorial view of the separate control housing of FIG. 10.

While most older automobile radios provided radio control knob shafts extending forwardly from the front of the radio to extend through the dashboard radio control knob shaft openings, with radio control knobs placed on the ends of the radio control knob shafts, a number of Chrysler and Dodge radios in the 1964-1974 time period had thumbroller controls mounted on the radio face plate rather than radio control knobs. FIGS. 10 and 11 show thumbroller controls 112 mounted in a thumbroller control housing 114. A back projection 116 extending from the back of thumbroller control housing 114 is adapted to fit through a mounting hole in a mounting bracket to mount the thumbroller control housing and has a plug 118 to receive a cable, not shown, which operatively connects the thumbroller control housing to the radio case. The thumbroller controls 112 take the place of the radio control knobs and the thumbroller control housings 114 take the place of the control housings 28 associated with the control knob shafts and control knobs.

Figure 15:
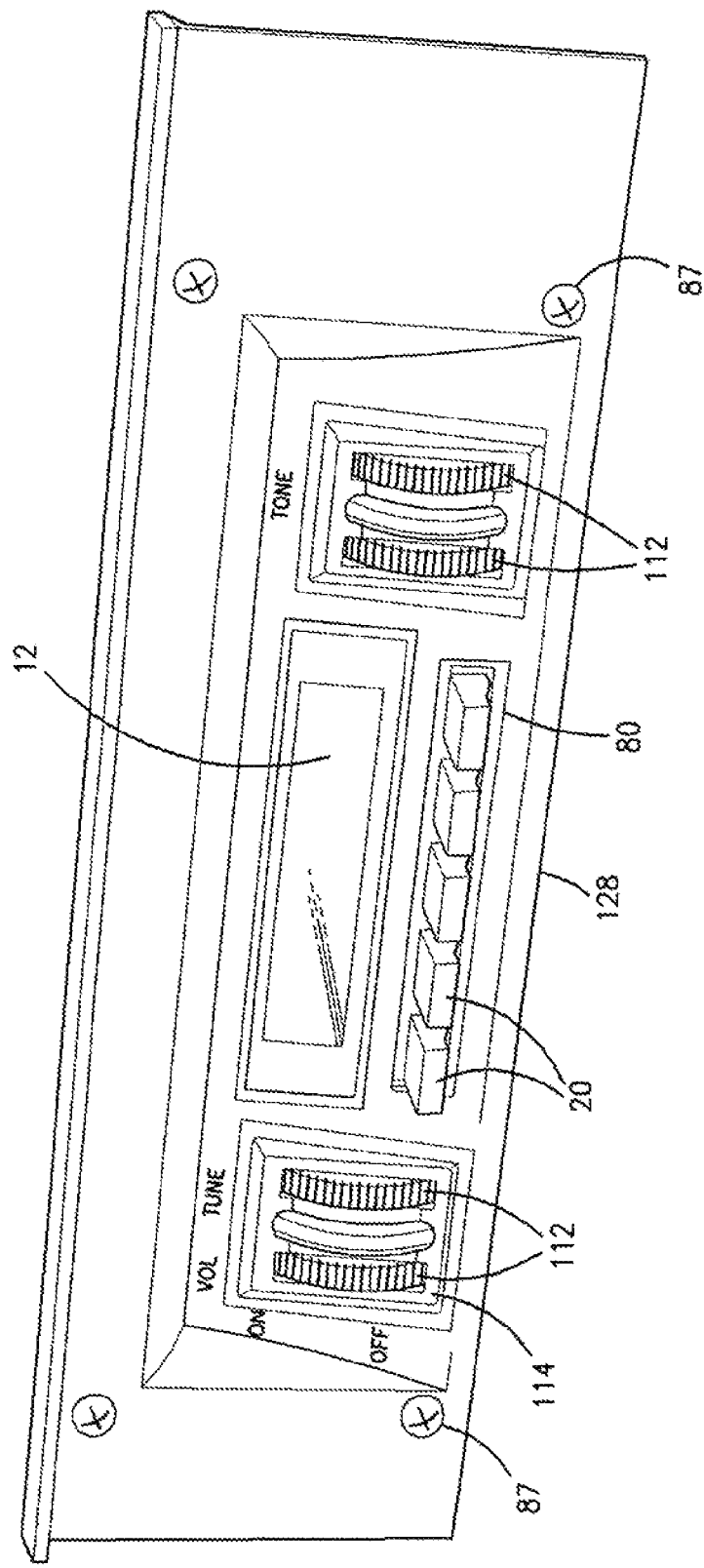
FIG. 15 is a view of a dashboard faceplate similar to that of FIG. 6, showing an installed replacement automobile radio having separate display and push button assemblies and having thumbroller controls.

FIGS. 12-14 show an embodiment of an arrangement of a display assembly 12, push button assembly 80, and thumbroller control housings 114, along with a radio case 10. The display assembly 12 is positioned a desired distance above push button assembly 80. The two assemblies are secured together by a bracket 120. FIG. 14, which fits between outer and inner flanges 100 and 102 of the display assembly and outer and inner flanges 108 and 109 of the push button assembly, and extends between and connects the display assembly and push button assembly. Radio case 10 is secured by a bracket, not shown, to the display assembly and the push button assembly with the top of the display assembly extending above the top of the radio case and the bottom of the push button assembly extending below the bottom of the radio case. L brackets 122 are secured to the sides of the radio case with L bracket legs 124 extending outwardly from the sides of the radio case 10 at the front of the case. It should be noted that if radio case 10 was not secured to the unit, but was located remotely, L brackets 122 would be secured directly to the display assembly outer flanges 100, or to both the display assembly outer flanges 100 and the push button assembly outer flanges 108. L bracket legs 124 have rectangular holes therein to receive and hold thumbroller control housing back projections 116 therein which hold thumbroller control housings 114 against the front of L bracket legs 124 thereby securing all of the components together in a rigid assembly that can be mounted to the dashboard of an automobile so that the display, the push buttons, and the thumbroller controls project through openings in the dashboard and/or through openings in a decorative faceplate. Radio 10 includes a plug 126 to connect a cable coming from the plug 118 in the back of the thumbroller back projection 116, FIG. 11. FIG. 15 is similar to that of FIG. 6, and shows the visual display 12, push buttons 20, and thumbroller controls 112 projecting through separate openings in decorative faceplate 128. This represents the general appearance of the original Chrysler and Dodge radios using thumbroller controls in the 1964-1974 time period.

Since the purpose of the invention is to make a limited number of car radios and display assemblies that will fit into and replace the original radios in a number of older automobiles, each visual display is designed to fit into a large number of different makes and models of older automobiles. Thus, the same display assembly may fit into a number of Ford automobiles, Chevrolet and other General Motors vehicles, etc. While decorative faceplates will be provided to be used with appropriate display assemblies, push button assemblies, and control knob arrangements to provide the arrangement and look of the original radio in the dashboard, the visual displays are not marked with the original distinctive radio dial artwork usually included with the original radio visual display. Such art work usually included dial markings to indicate radio tuning bands and often included vehicle make names and/or logos. Therefore, one aspect of the invention may include providing transparent display covers adapted to be placed over the display screen of the visual display of the replacement display assembly. Such display covers will have the markings and/or logo printed thereon that were included on the original radio display screen. The appropriate screen cover for the particular automobile in which the radio is installed will complete the installation of the radio in the particular automobile and provide the appearance of the original radio display.

Figure 16:
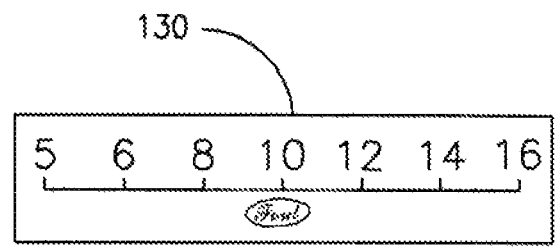
FIG. 16 is a pictorial view of a transparent visual display cover containing display markings.
Figure 17:
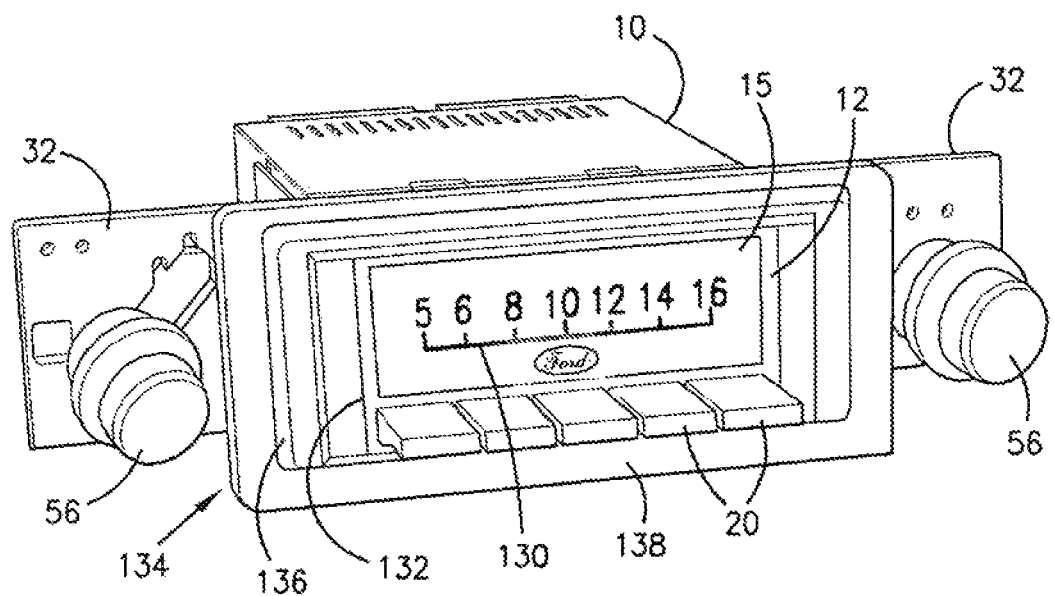
FIG. 17 is a pictorial view of a replacement radio of the invention ready for installation into a dashboard and having the transparent visual display cover of FIG. 16 applied to the visual display of the replacement radio.

FIG. 16 shows a transparent material display cover 130 that can be placed over the screen of the visual display of the display assembly to provide markings on the display similar to the markings originally provided on the visual display of the original radio that is being replaced. This is the final step in making the replacement radio look as close as possible to the original radio being replaced. The display covers may be made in many specific designs to match the original display design of many different specific older automobile radios. Thus, while a particular display assembly of the invention is made to fit into many different older automobiles as a replacement for many specific radios having different display designs, the display cover will allow a user to give the display the look of the specific radio being replaced. While the display cover 130 can be made of many different materials and may have different methods for attachment to a display screen of the display assembly of the invention or to a display screen of a complete replacement radio such as shown in my referenced U.S. Pat. No. 7,734,276, it has been found satisfactory to make the display cover of a plastic material which will self adhere to the display screen when placed on the display screen by a user. Plastic sheet materials such as PET (polyethylene terephthalate) or TPU (thermoplastic polyurethane) as commonly used for cell phone screen protectors, or even temper glass material such as used in cell phone screen protectors, have been found satisfactory. These materials will usually adhere to the display surface without an added adhesive, and can be positioned, repositioned, and easily removed by a user. With such materials, display cover 130 will usually be supplied to a user already cut to the proper size to fit over a particular display assembly screen, and may be easily positioned by a user over the particular display assembly screen being covered. FIG. 17 shows an embodiment of an assembled replacement radio of the invention using a display assembly 12 including both the visual display, screen 15, and push buttons 20 as shown in FIGS. 1-4, and with the radio case 10 mounted directly behind the display assembly. Display assembly 12 extends through a display opening 132 in a decorative faceplate in the form of a bezel 134, with raised portion 136 sized and shaped to fit into the dashboard display opening of a particular Ford automobile with raised portion 136 filling in the gap between the display assembly 12 and the edges of the dashboard display opening, with decorative faceplate flange 138 remaining behind the dashboard when the assembly is mounted in the dashboard. Control knob shafts, not visible, on which control knobs 56 are mounted, are spaced in L brackets 32 to extend through dashboard radio shaft openings in the dashboard of the particular Ford automobile in which the radio is to be mounted. It should be noted that the control knobs 56 are chosen to match the original control knobs used in the original radio supplied in the particular Ford automobile. With the removal of the control knobs 56, the replacement radio is ready to be mounted in the dashboard of the particular Ford automobile with the radio control knob shafts passing through the radio control knob shaft openings in the dashboard and the raised portion 136 of bezel 134 passing through the radio display opening in the dashboard. The display screen 15 of radio display assembly 12 is initially blank without dial marks and other art work that would have been provided with the original radio in the particular Ford automobile. Display cover 130 shown in FIG. 16 is printed with the dial markings and the FORD name and logo as was provided on the radio display of the original radio supplied with the particular Ford automobile in which the radio will be installed. The replacement radio as shown in FIG. 17 ready to be installed in the particular Ford vehicle has display cover 130 attached to display screen 15. With display cover 130 attached to screen 15, as shown, the radio display screen 15 will have the same appearance as the original radio being replaced.

As described above, when the replacement radio is provided in a number of separate components, it is necessary to interconnect the components so that signals from one component can be communicated to other components. The radio electronics in radio case 10 will general collect the signals from the various components and send signal, where needed, back to the other separate components. Thus, each of the components will have communication connections capable of connecting with communication connections in the other components they need to communicate with. These communication connections will generally be electrical cable connections, as described, which connect one end of an electrical cable to one component and connect the other end of the electrical cable to another component. These cable connections can be hard wire connections or a socket and plug to connect the ends of a cable to a component, or can be other connections either with wires or without, such as wireless connections which would usually include wireless transmitters and wireless receivers. Further, the various components can be secured to the dashboard or other parts of the automobile in any satisfactory manner which will hold the various components in desired position. Various brackets, straps, and connectors can be used.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A replacement vehicle radio to replace an original vehicle radio mounted in a vehicle dashboard having a dashboard radio display opening, the original vehicle radio including an original radio case having radio electronics therein, an original radio display as part of the original radio case and fitting into the dashboard radio display opening, and a plurality of original radio controls, comprising:
 a replacement radio case having radio electronics therein;
 a replacement radio display assembly separate from the replacement radio case having a replacement radio display sized to fit into the dashboard radio display opening in which it is expected the replacement radio will be placed;
 a plurality of replacement radio controls mounted in at least one replacement radio control housing separate from the replacement radio case and replacement radio display assembly; and
 communication connections in the radio electronics, the replacement radio display assembly, and the at least one replacement radio control housing to enable communication between the replacement radio display assembly and the radio electronics and between the at least one replacement radio control housing and the radio electronics.

2. A replacement vehicle radio according to claim 1, wherein the original radio that the replacement vehicle radio is replacing had a set of radio push buttons, and wherein the replacement radio display assembly includes a visual display and a set of push buttons.

3. A replacement vehicle radio according to claim 2, wherein the dashboard radio display opening has an edge defining the dashboard radio display opening, and wherein the replacement radio display sized to fit into the dashboard radio display opening is smaller than the dashboard radio display opening, and wherein the replacement vehicle radio additionally includes a decorative faceplate configured to receive the replacement radio display sized to fit into the dashboard radio display opening and to extend from the replacement radio display sized to fit into the dashboard radio display opening to at least the edge defining the dashboard radio display opening to disguise any gap otherwise present between the replacement radio display sized to fit into the dashboard radio display opening, and the edge defining the dashboard radio display opening.

4. A replacement vehicle radio according to claim 3, wherein the decorative faceplate includes a flange adapted to extend behind the dashboard beyond the edge defining the dashboard radio display opening.

5. A replacement vehicle radio according to claim 3, wherein the decorative faceplate is adapted to extend over the dashboard beyond the edge defining the dashboard radio display opening.

6. A replacement vehicle radio according to claim 1, wherein the original radio that the replacement vehicle radio is replacing had as set of radio push buttons, said replacement vehicle radio additionally including a replacement radio push button assembly separate from the replacement radio case and the replacement radio display assembly, said radio push button assembly having a set of replacement radio push buttons, and a communication connection to enable communication between the replacement radio push button assembly and the radio electronics.

7. A replacement vehicle radio according to claim 6, wherein the communication connection is an electrical cable connector.

8. A replacement vehicle radio according to claim 6, wherein the vehicle dashboard additionally has a dashboard radio push button opening, and the set of replacement radio push buttons is sized to fit into the dashboard radio push button opening.

9. A replacement vehicle radio according to claim 6, wherein the replacement radio display of the replacement radio display assembly and the set of replacement radio push buttons of the replacement radio push button assembly together fit into the dashboard radio display opening.

10. A replacement vehicle radio according to claim 9, additionally including at least one bracket attaching the replacement radio push button assembly to the replacement radio display assembly.

11. A replacement vehicle radio according to claim 9, wherein the dashboard radio display opening has an edge defining the dashboard radio display opening, and wherein the replacement vehicle radio additionally includes a decorative faceplate configured to receive therethrough the replacement radio display sized to fit into the dashboard radio display opening and to receive therethrough the set of replacement radio push buttons and to extend from the replacement radio display sized to tit into the dashboard radio display opening and the net of replacement radio push buttons to at least the edge defining the dashboard radio display opening to disguise any gap otherwise present between the replacement radio display sized to fit into the dashboard radio display opening, the set of replacement radio push buttons, and the edge defining the dashboard radio display opening.

12. A replacement vehicle radio according to claim 11, wherein the decorative faceplate includes a flange adapted to extend behind the dashboard beyond the edge defining the dashboard radio display opening.

13. A replacement vehicle radio according to claim 11, wherein the decorative faceplate is adapted to extend over the dashboard beyond the edge defining the dashboard radio display opening.

14. A replacement vehicle radio according to claim 6, additionally including at least One bracket attaching the replacement radio push button assembly, the replacement radio display assembly, and the at least one replacement radio control housing together as a unit.

15. A replacement vehicle radio according to claim 14, wherein the at least one bracket is adapted to mount the unit to the automobile dashboard.

16. A replacement vehicle radio according to claim 14, wherein the at least one bracket also attaches the radio case to the unit.

17. A replacement vehicle radio according to claim 1, wherein the communication connections are electrical cable connectors.

18. A replacement vehicle radio according to claim 1, wherein the original radio that the replacement vehicle radio is replacing had an original radio display with an original visual display having display markings thereon, wherein the replacement radio display includes a replacement visual display without the display markings thereon, said replacement vehicle radio additionally including a transparent material display cover having display markings thereon for application to the replacement visual display to add the display markings to the replacement visual display.

19. A replacement vehicle radio according to claim 18, wherein the transparent material display cover is made of a material that will adhere to the replacement visual display without the display markings thereon.

20. A replacement vehicle radio according to claim 18, wherein the transparent material display cover is made of a material that will removably adhere to the replacement visual display without the display markings thereon.

* * * * *